US012334570B2

(12) United States Patent
Liang et al.

(10) Patent No.: US 12,334,570 B2
(45) Date of Patent: Jun. 17, 2025

(54) TOP COVER ASSEMBLY OF SECONDARY BATTERY AND SECONDARY BATTERY

(71) Applicant: CONTEMPORARY AMPEREX TECHNOLOGY (HONG KONG) LIMITED, Hong Kong (CN)

(72) Inventors: Chengdu Liang, Ningde (CN); Kai Wu, Ningde (CN); Xinxiang Chen, Ningde (CN); Shoujun Huang, Ningde (CN); Baisong Chen, Ningde (CN); Huasheng Su, Ningde (CN); Guowei Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 999 days.

(21) Appl. No.: 15/733,847

(22) PCT Filed: Mar. 24, 2020

(86) PCT No.: PCT/CN2020/080879
§ 371 (c)(1),
(2) Date: Nov. 30, 2020

(87) PCT Pub. No.: WO2020/207238
PCT Pub. Date: Oct. 15, 2020

(65) Prior Publication Data
US 2021/0234219 A1 Jul. 29, 2021

(30) Foreign Application Priority Data
Apr. 9, 2019 (CN) .......................... 201910281152.6

(51) Int. Cl.
*H01M 50/15* (2021.01)
*H01M 10/0525* (2010.01)
(Continued)

(52) U.S. Cl.
CPC ....... *H01M 50/15* (2021.01); *H01M 10/0525* (2013.01); *H01M 50/176* (2021.01);
(Continued)

(58) Field of Classification Search
CPC .. H01M 50/15; H01M 50/155; H01M 50/176; H01M 50/183; H01M 50/188;
(Continued)

(56) References Cited

U.S. PATENT DOCUMENTS 6,117,586 A * 9/2000 Kim .................... H01M 50/147
429/175
6,743,546 B1 6/2004 Kaneda et al.
(Continued)

FOREIGN PATENT DOCUMENTS

CN 207233789 U 4/2018
CN 108428824 A 8/2018
(Continued)

OTHER PUBLICATIONS

Engish translation of Li et al. (CN-109428017-A). Published Mar. 5, 2019. (Year: 2019).*
(Continued)

*Primary Examiner* — Jonathan G Leong
*Assistant Examiner* — Drew C Newman
(74) *Attorney, Agent, or Firm* — STERNE, KESSLER, GOLDSTEIN & FOX P.L.L.C.

(57) ABSTRACT

The present disclosure relates to a top cover assembly of a secondary battery and a secondary battery, wherein the top cover assembly includes a top cover plate, provided with a through hole; an electrode terminal, covering the through hole; an insulating plate, wherein at least part of the insulating plate is arranged on a side of the top cover plate away from the electrode terminal; a seal, wherein at least part of the seal is arranged between the top cover plate and the
(Continued)

electrode terminal; and an insulator, wherein at least part of the insulator is arranged between the top cover plate and the insulating plate; wherein the insulator and the seal at least jointly enclose a side wall of the through hole and an area, close to the through hole, on an upper surface of the top cover plate.

10 Claims, 6 Drawing Sheets

(51) Int. Cl.
*H01M 50/176* (2021.01)
*H01M 50/188* (2021.01)
*H01M 50/547* (2021.01)
*H01M 50/593* (2021.01)

(52) U.S. Cl.
CPC ....... *H01M 50/188* (2021.01); *H01M 50/547* (2021.01); *H01M 50/593* (2021.01); *H01M 2220/20* (2013.01)

(58) Field of Classification Search
CPC ............. H01M 50/547; H01M 50/593; H01M 50/557; H01M 50/147; H01M 50/572; H01M 10/0525
See application file for complete search history.

(56) References Cited

U.S. PATENT DOCUMENTS

| | | | |
|---|---|---|---|
| 8,790,821 | B2 | 7/2014 | Ito et al. |
| 10,763,466 | B2 | 9/2020 | Chen et al. |
| 2003/0124420 | A1 | 7/2003 | Fong et al. |
| 2007/0232123 | A1 | 10/2007 | Uh |
| 2013/0095364 | A1 | 4/2013 | Yong et al. |
| 2015/0180007 | A1* | 6/2015 | Ohta ................... H01M 50/553 429/179 |
| 2015/0214511 | A1 | 7/2015 | Seong |
| 2017/0163059 | A1* | 6/2017 | Tamaru ................. H01G 11/74 |
| 2017/0214030 | A1* | 7/2017 | Tsutsumi .............. H01M 50/55 |
| 2017/0352846 | A1 | 12/2017 | Li et al. |
| 2017/0352860 | A1 | 12/2017 | Li et al. |
| 2019/0109305 | A1 | 4/2019 | Zheng et al. |
| 2019/0363331 | A1* | 11/2019 | Wakimoto ............ H01M 50/15 |

FOREIGN PATENT DOCUMENTS

| | | |
|---|---|---|
| CN | 108767143 A | 11/2018 |
| CN | 109428017 A | 3/2019 |
| CN | 109659453 A | 4/2019 |
| CN | 208690318 U | 4/2019 |
| CN | 110176558 A | 8/2019 |
| CN | 209658243 U | 11/2019 |
| EP | 2388849 A1 | 11/2011 |
| JP | 2009087613 A * | 4/2009 |

OTHER PUBLICATIONS

English translation of Maeda et al. (JP-2009087613-A). (Year: 2009).*

Extended European Search Report issued in European Application No. 20788020.4, mailed Jul. 8, 2021, 5 pages.

Notice of Allowance issued in Chinese Application No. 201910281152, mailed Feb. 4, 2024, 6 pages.

* cited by examiner

TOP COVER ASSEMBLY OF SECONDARY BATTERY AND SECONDARY BATTERY

CROSS-REFERENCE TO RELATED APPLICATIONS

This application is a National Stage of International Application No. PCT/CN2020/080879 filed on Mar. 24, 2020, which claims the priority of the Chinese patent application No. 201910281152.6, entitled "TOP COVER ASSEMBLY OF SECONDARY BATTERY AND SECONDARY BATTERY" and filed on Apr. 9, 2019, both of which are incorporated herein by reference in their entireties.

FIELD OF THE DISCLOSURE

The present disclosure relates to the technical field of batteries, in particular to a top cover assembly of a secondary battery and a secondary battery.

BACKGROUND OF THE DISCLOSURE

Owing to such advantages as high energy density, high power density, multiple cycles and long storage time, lithium-ion batteries are widely used in electric vehicles. During the actual use of the lithium-ion batteries, it is found that a cell will have such safety risks as outbreak of fire and explosion.

SUMMARY OF THE DISCLOSURE

According to an aspect of the present disclosure, a top cover assembly of a secondary battery is provided, and the top cover assembly includes:
  a top cover plate, provided with a through hole;
  an electrode terminal, covering the through hole;
  an insulating plate, wherein at least part of the insulating plate is arranged on a side of the top cover plate away from the electrode terminal;
  a seal, wherein at least part of the seal is arranged between the top cover plate and the electrode terminal; and
  an insulator, wherein at least part of the insulator is arranged between the top cover plate and the insulating plate;
  wherein the insulator and the seal at least jointly surround a side wall of the through hole and an area of an upper surface of the top cover plate close to the through hole.
  In some embodiments, the seal is of an annular structure, including:
    a first part, arranged between the top cover plate and the electrode terminal; and
    a second part, wherein an outline dimension of the second part on a cross section is smaller than that of the first part, and the second part is arranged on a side of the insulator close to the center of the through hole and is in contact with the insulator.
  In some embodiments, the insulator further covers an area of an lower surface of the top cover plate close to the through hole.
  In some embodiments, the insulator is of an annular structure, including:
    a third part, arranged between the top cover plate and the insulating plate; and
    a fourth part, wherein an outline dimension of the fourth part on a cross section is smaller than that of the third part, an outer surface of the fourth part is fit with the side wall of the through hole, and a top surface of the fourth part is not lower than the upper surface of the top cover plate in contact with the seal.
  In some embodiments, wherein the insulator is of an annular structure and includes:
    a third part, arranged between the top cover plate and an insulating plate; and
    a fourth part, wherein an outline dimension of the fourth part on a cross section is smaller than that of the third part, an outer surface of the fourth part is fit with the side wall of the through hole, and a top surface of the fourth part is higher than a bottommost surface of the seal.
  In some embodiments, a concave-convex matching structure is arranged between the seal and the insulator.
  In some embodiments, the seal is of an annular structure and includes: a first part and a second part, wherein the first part is arranged between the top cover plate and the electrode terminal, an outline dimension of the second part on a cross section is smaller than that of the first part, and the second part is arranged on a side of the insulator close to a center of the through hole and is in contact with the insulator;
    the insulator is of an annular structure and includes: a third part and a fourth part, wherein the third part is arranged between the top cover plate and the insulating plate; and an outline dimension of the fourth part on a cross section is smaller than that of the third part, and the outer surface of the fourth part is fit with the side wall of the through hole; and
    wherein a groove is formed at a bottom surface of the first part, and a top end of the fourth part is embedded into the groove to form the concave-convex matching structure.
  In some embodiments, the top end of the fourth part is a straight wall section; or
    the top end of the fourth part is provided with a bending section, and the bending section extends towards a side away from the second part and is fit to the upper surface of the top cover plate in contact with the seal.
  In some embodiments, the insulating plate includes a first main body part and an annular extending part which are connected with each other, the extending part extends to the through hole and at least part of the extending part is arranged in the through hole, and a bottom end of the second part abuts against a top end of the extending part.
  In some embodiments, a contact surface between the extension part and the second part is a horizontal plane; or
    a contact surface between the extension part and the second part is gradually inclined downwards from the inner side to the outer side of the through hole; or
    an outer edge of the top end of the extending part is provided with an annular groove, and the bottom end of the second part abuts in the annular groove.
  In some embodiments, the insulating plate includes a first main body part and an annular extending part which are connected with each other, the extending part extends to the through hole and at least part of the extending part is arranged in the through hole, the second part is arranged between the insulator and the extending part, and the extending part is in contact with the second part.
  In some embodiments, the top end of the extending part extends to a bottom surface of the electrode terminal and is not in contact with the bottom surface of the electrode terminal.
  In some embodiments, a protruding part is arranged at an outer side of a connecting portion between the extending part and the first main body part, and the second part extends downwards until the second part is in sealed connection with the protruding part.

In some embodiments, the protruding part includes an oblique plane arranged at the connecting portion between the extending part and the first main body part; or the protruding part includes a step arranged at the connecting portion between the extending part and the first main body part.

In some embodiments, a cavity is formed among the third part, the top cover plate and the insulating plate.

In some embodiments, the third part is provided with a bulge, the top cover plate is provided with a matching hole, and the bulge is matched with the matching hole to fix the third part and the top cover plate.

In some embodiments, an accommodating groove is arranged on at least one of the top cover plate and the insulating plate, the third part is arranged in the accommodating groove, and the top cover plate is in contact with the insulating plate in the area outside the accommodating groove.

According to another aspect of the present disclosure, a secondary battery is provided, and the secondary battery includes:

a housing;

an electrode assembly, arranged in the housing; and the top cover assembly of the secondary battery according to the above embodiments, arranged above the electrode assembly and closes the housing.

BRIEF DESCRIPTION OF THE ACCOMPANYING DRAWINGS

The drawings described herein provide a further understanding of the present disclosure, and constitute a part of the present disclosure. The exemplary embodiments of the present disclosure and descriptions thereof are used for explaining the present disclosure, rather than constituting an improper limitation to the present disclosure. In the drawings.

REFERENCE NUMERALS IN THE FIGURES

Figure 1:
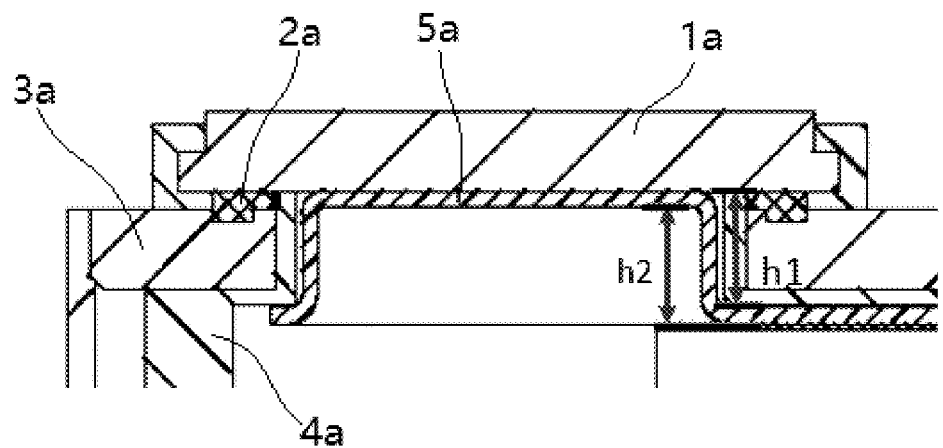
FIG. 1 is a structural schematic diagram of a secondary battery in the related technology.

1*a*, electrode terminal; 2*a*, sealing ring; 3*a*, top cover plate; 4*a*, insulating plate; 5*a*, connecting piece; 1, electrode terminal; 11, fixed seat; 12, terminal plate; 2, seal; 21, first part; 22, second part; 23, groove; 3, top cover plate; 31, through hole; 32, concave part; 33, matching hole; 34, exhaust component; 35, injecting hole; 4, insulator; 41, third part; 411, bulge; 42, fourth part; 43, bending section; 5, insulating plate; 51, first main body part; 52, extending part; 53, protruding part; 54, accommodating groove; 55, concave part; 6, connecting piece; 61, second main body part; 62, convex part; 7, electrode assembly; 71, tab; 8, housing.

DETAILED DESCRIPTION OF THE PREFERRED EMBODIMENTS

The present disclosure will be described in detail below. In the following paragraphs, different aspects of the embodiments are defined in more details. Each aspect thus defined can be combined with one or more of any other aspects, unless it is expressly stated that each aspect cannot be combined with other aspects. Especially, any characteristic which is deemed to be preferable or beneficial can be combined with one or more other characteristics which are deemed to be preferable or beneficial.

Such terms as "first" and "second" in the present disclosure are merely for the convenience of description, to distinguish different components with the same name, but do not represent precedence or subordination.

In addition, when one element is called to be "on" another element, the element can be directly arranged on the other element, or can be indirectly arranged on the other element and one or more intermediate elements are inserted therebetween. In addition, when one element is called to be "connected to" another element, the element can be directly connected to the other element, or can be indirectly connected to the other element and one or more intermediate elements can be inserted therebetween. In the following text, the same reference numerals represent the same element.

In order to clearly describe each orientation in the following embodiments, each direction of a secondary battery is defined in a coordinate system in FIG. 2, wherein x direction represents a length direction of the secondary battery; y direction is vertical to the x direction in a horizontal plane, and represents a width direction of the secondary battery; and z direction is vertical to a plane formed by x direction and y direction, and represents a height direction of the secondary battery.

Based on the definition of orientations, the description of such orientation or positional relationship indicated by such terms as "up", "down", "top", "bottom", "inner" and "outer" is merely for the convenience of the description of the present disclosure, rather than indicating or implying that the device referred to must be located in a certain orientation or must be constructed or operated in a certain orientation, therefore, the terms cannot be understood as a limitation to the protection scope of the present disclosure.

The inventor found that, the voltage of a complete vehicle system is about 300V to 900V. When a cell is abnormal, an internal circuit or a fusing part will be disconnected, at this time, the cell will be subjected to a reverse high voltage of the system, however, since the internal safety distance is not sufficient, therefore, the cell will have such safety risks as outbreak of fire or explosion.

A related technology known by the inventor is as shown in FIG. 1, and the top cover assembly of the battery includes: an electrode terminal 1a, a sealing ring 2a, a top cover plate 3a and an insulating plate 4a, wherein the top cover plate 3a is provided with a through hole, the electrode terminal 1a covers the through hole above the top cover plate 3a, the insulating plate 4a is arranged below the top cover plate 3a, the insulating plate 4a is provided with an extending part which penetrates through the through hole and extends to the bottom of the electrode terminal 1a, and the sealing ring 2a is arranged in a space enclosed by the electrode terminal 1a, the top cover plate 3a and the top end of the extending part. The connecting piece 5a protrudes upwards at the through hole to conduct the electrode assembly and the electrode terminal 1a. However, the safety risk of such a battery is higher during actual use.

Through analysis, the inventor found that the reasons of lower safety of the secondary battery in the related technology are as follows:

Firstly, as shown in FIG. 1, a creepage distance between the top cover plate 3a and the electrode terminal 1a is merely a length section in which the sealing ring 2a is in contact with the top end of the extending part of the insulating plate 4a, such as the position indicated by the bold lines in FIG. 1, the creepage distance is very short, the safety risk is high under a reverse high voltage, and such phenomenon as outbreak of fire or explosion may occur.

Secondly, the extending part of the insulating plate 4a will fall with the following reasons: fuse plastics are arranged on a positive connecting piece, such that a gap is formed between the horizontal part of the positive connecting piece and the insulating plate 4a; on a side of the negative connecting piece, a gap will also be reserved between the horizontal part of the negative connecting piece and the insulating plate 4a, if h2=h1 in FIG. 1, due to a manufacturing tolerance, a convex hull of the connecting piece 5a may not reach the electrode terminal 1a, thereby leading to poor welding, therefore, h2>h1 is actually required, to ensure firm welding between the connecting piece 5a and the electrode terminal 1a, therefore, a gap Δh=h2−h1 will be formed between the insulating plate 4a and the horizontal part of the connecting piece 5a.

Meanwhile, the part, arranged in the through hole, of the insulating plate 4a is equivalent to a cantilever beam, therefore, the extending part easily drops, then the insulating plate 4a moves downwards, and a gap is formed between the top part of the extending part and the sealing ring 2a, thereby leading to the following problems: 1, an electric gap will be formed between the top cover plate 3a and the electrode terminal 1a and between the top cover plate 3a and the connecting piece 5a, however, the electric gap is small, and the breakdown risk is high, so the safety is poor; and 2, electrolyte will enter into the sealing interface between the sealing ring 2a and the insulating plate 4a, the electrolyte on the creepage path is increased, the resistance is reduced, and when a voltage of greater than 500V is applied between the electrode terminal 1a and the top cover plate 3a, safety risk exists.

Based on the above problems, in the present disclosure, the secondary battery is improved to improve the safety of the secondary battery, and the main improvement idea lies in increasing the creepage distance and increasing the electric gap. Therefore, embodiments of the present disclosure provide a top cover assembly of a secondary battery and a secondary battery, to improve safety of the secondary battery during high-voltage discharge.

As to the top cover assembly of the secondary battery in an embodiment of the present disclosure, through adding an insulator between the top cover plate and the insulating plate, the creepage distance between the top cover plate and the electrode terminal can be increased, when an electrode assembly is abnormal and high-voltage discharge occurs, the safety distance inside the secondary battery is equivalent to be added, thereby lowering the possibility of such risks of outbreak of fire and explosion of a cell, and improving operating safety of the secondary battery.

Figure 2:
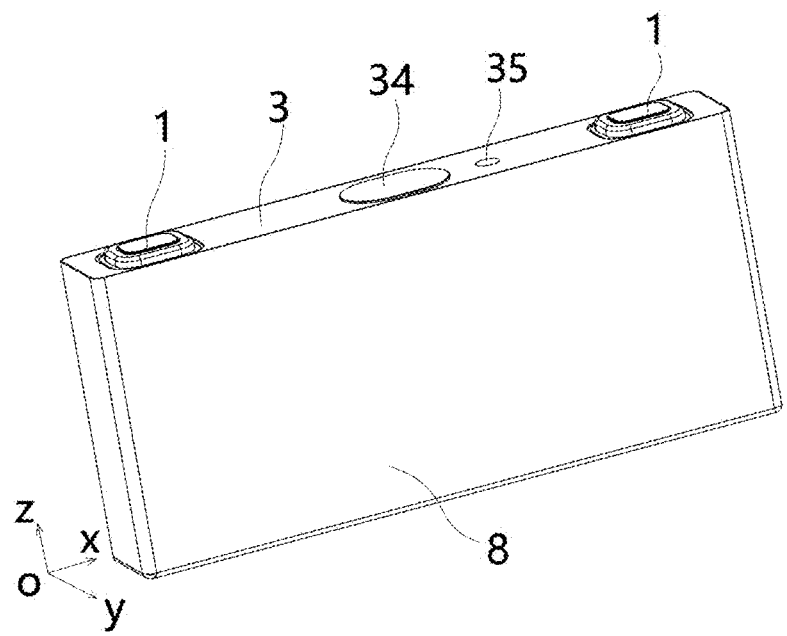
FIG. 2 is a structural schematic diagram of some embodiments of a secondary battery of the present disclosure.
Figure 4:
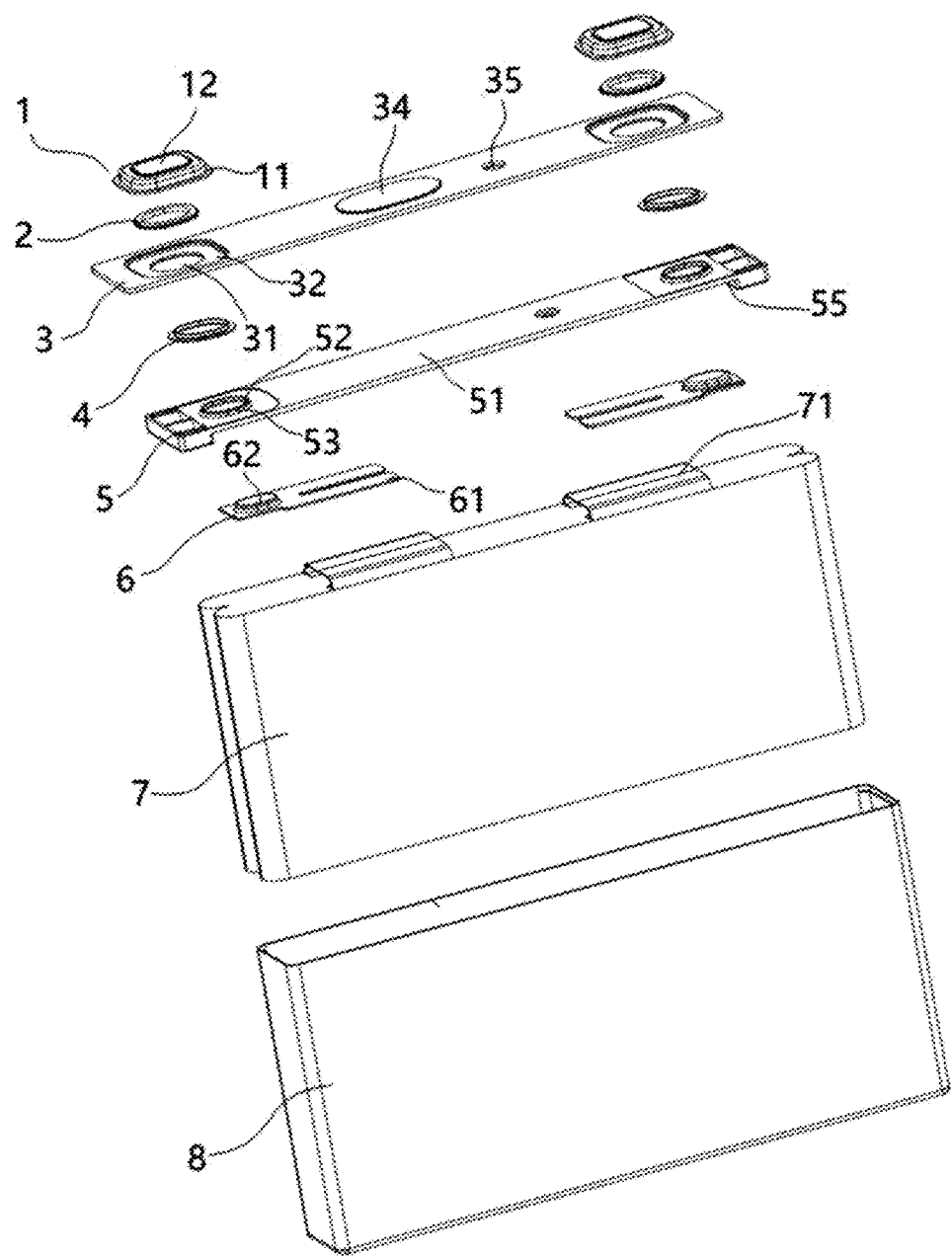
FIG. 4 is an exploded view of some embodiments of a secondary battery of the present disclosure.

FIG. 2 is a structural schematic diagram of some embodiments of a secondary battery of the present disclosure, and its exploded view is as shown in FIG. 4. The secondary battery can include a housing 8, an electrode assembly 7, a top cover assembly and a connecting piece 6.

The electrode assembly 7 is arranged in the housing 8, and includes a first electrode and a second electrode with opposite polarities, for example, the first electrode is a positive electrode, and the second electrode is a negative electrode. The first electrode and the second electrode both include a coated part and an uncoated part, and the uncoated part is arranged at an end part, along a length direction of the electrode assembly 7, of the coated area, and forms a tab.

The top cover assembly is arranged above the electrode assembly 7, and closes the opening of the housing 8. The top cover assembly includes: a top cover plate 3, an insulating plate 5 and two electrode terminals 1. A brief description will be given below on each part in the top cover assembly.

Figure 3:
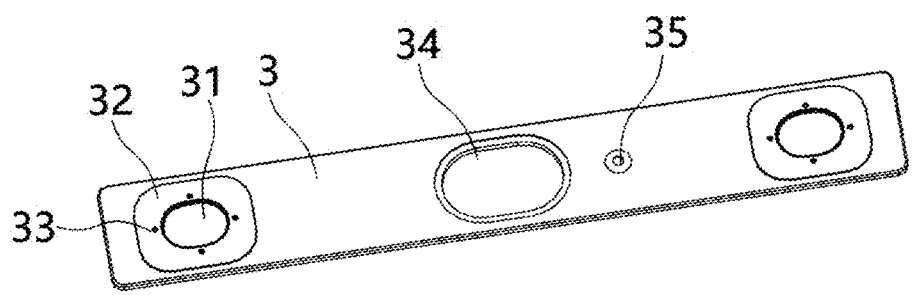
FIG. 3 is a structural schematic diagram of a bottom part of a top cover plate in a top cover assembly of a secondary battery of the present disclosure.

FIG. 3 is a structural schematic diagram of some embodiments of the top cover plate, and the top cover plate 3 is of a thin plate structure, and is arranged on the opening of the housing 8. A through hole 31 for drawing out the electric energy of the first electrode and the second electrode is respectively arranged at two ends, along a length direction, on the top cover plate 3, and the shape of the through hole 31 is adapted to the shape of the electrode terminal 1, for example, the through hole 31 can be circular, rectangular or elliptical. The top end of the through hole 31 is provided with a sunken part 32, and the electrode terminal 1 is fixed in the sunken part 32, and is arranged at the outer side of the top cover plate 3 and covers the through hole 31. An exhaust component 34 and an injecting hole 35 are arranged in the middle area, along a length direction, of the top cover plate 3, and the exhaust component 34 can adopt such existing structure as an anti-explosion piece to release gas in the secondary battery, thereby playing a role of ensuring safety; and the injecting hole 35 is configured to inject electrolyte into the secondary battery, and seal the opening through the seal.

As shown in FIG. 4, at least part of the insulating plate 5 is arranged on a side of the top cover plate 3 away from the electrode terminal 1, and is arranged between the cover plate 3 and the electrode component 7, the shape of the insulating plate 5 is adapted to the top cover plate 3, to isolate the electrode assembly 7 and the top cover plate 3 and play a role of insulating, for example, the insulating plate 5 can be made of insulating materials like plastics.

Still refer to FIG. 4, to simplify the structure of the electrode terminal 1, the electrode terminal 1 includes a fixed seat 11 and a terminal plate 12. Wherein the fixed seat 11 is provided with an accommodating space which is adapted to the shape of the terminal plate 12, to arrange the terminal plate 12 in the accommodating space, and the fixed seat 11 can limit the movement of the terminal plate 12 along a thickness direction. The fixed seat 11 can adopt a step columnar structure, an end, with a larger cross section, of the step columnar structure is arranged in the sunken part 32, to fix the electrode terminal 1 on the top cover plate 3.

Figure 5:
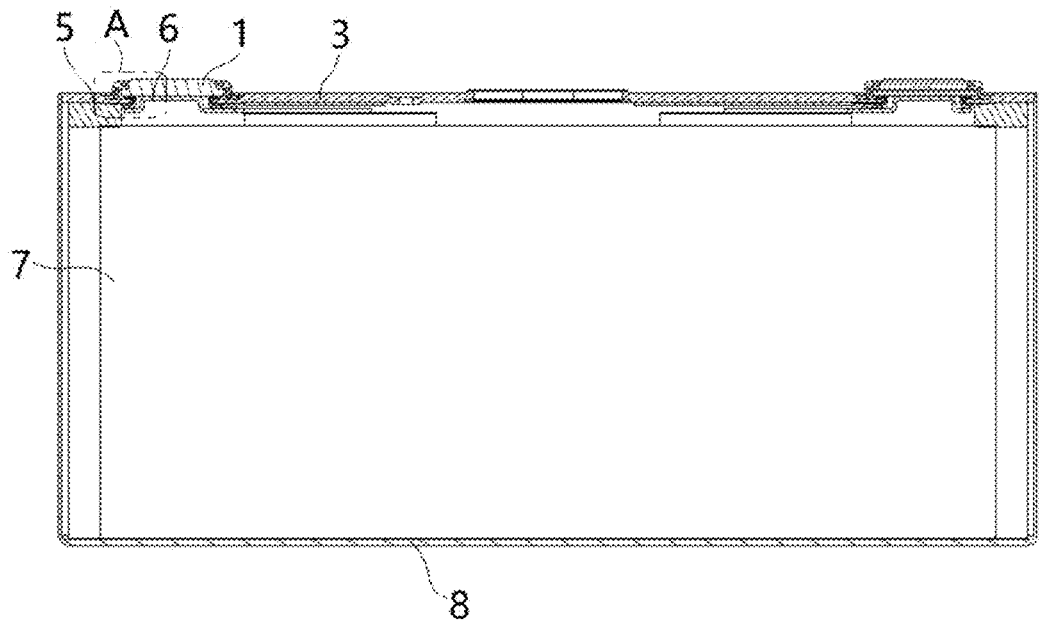
FIG. 5 is a sectional view of some embodiments of the secondary battery of the present disclosure.

The terminal plate 12 is communicated with the inside of the housing 8 through the through hole 31, and a connecting piece 6 is arranged between a lower side of the top cover assembly and the electrode assembly 7, such that the tab 71 at the top part of the electrode assembly 7 is electrically connected with the terminal plate 12 through a connecting piece 6. FIG. 4 shows an exploded view of the secondary battery and FIG. 5 shows a sectional view, the connecting piece 6 includes a second main body part 61 and a convex part 62 arranged on the second main body part 61, and the convex part 62 extends into the through hole 31 to be electrically connected with the terminal plate 12 of the electrode terminal 1. The bottom part of the insulating plate 5 is provided with a concave part 55, and the connecting piece 6 is arranged in the concave part 55. Through such a structure, the electrode terminal 1 does not need to occupy the space inside the housing 8, and the energy density of the secondary battery can be improved, moreover, the terminal plate 12 is easily processed, and the embodiments given below are all given with such a structural form as an example. Optionally, the electrode terminal 1 can also be stretched into the through hole 31.

After the overall structure of the secondary battery is given, the improvement points of the present disclosure will be described as an emphasis below.

Figure 6:
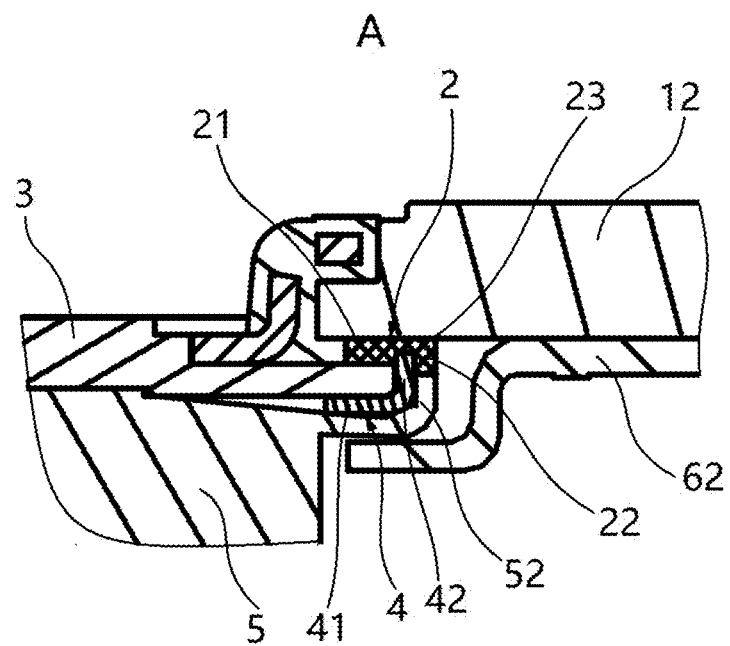
FIG. 6 is an enlarged view of A in FIG. 5.

FIG. 6 is an enlarged view of A of FIG. 5, and is a structural schematic diagram of some embodiments of the top cover assembly. Please refer to FIG. 6, firstly an embodiment encompassing the improvement ideas of the present disclosure is given below, and subsequently the embodiment of FIG. 6 is described in detail on this basis. The top cover assembly of the secondary battery of the present disclosure ("top cover assembly" for short subsequently) includes: a top cover plate 3, an electrode terminal 1, an insulating plate 5, a seal 2 and an insulator 4. Wherein the top cover plate 3 is provided with a through hole 31, the electrode terminal 1 covers the through hole 31, and at least part of the insulating plate 5 is arranged on a side of the top cover plate 3 away from the electrode terminal 1. At least part of the seal 2 is arranged between the top cover plate 3 and the terminal plate 12, and at least part of the insulator 4 is arranged between the top cover plate 3 and the insulating plate 5. The insulator 4 and the seal 2 jointly enclose the side wall of the through hole 31 and the area, close to the side wall of the through hole 31, of the upper and lower surfaces of the top cover plate 3. Optionally, the insulator 4 and the seal 2 can also only jointly enclose the side wall of the through hole 31 and the area, close to the side wall of the through hole 31, of the upper surface of the top cover plate 3, and the lower surface of the top cover plate 3 is not enclosed. The seal 2 can be made of silicone rubber, fluororubber and other materials, and the insulator 4 can adopt polyvinyl chloride (PVC), polypropylene (PP), polyethylene (PE) or polyethylene terephthalate (PET) and other materials resistant to electrolyte or strong acid.

As to the top cover assembly of the present embodiment, through adding an insulator 4 between the top cover plate 3 and the insulating plate 5, it can be seen from the section cutting plane which is in parallel with the xy plane that, when the seal 2 is sealed favorably, and the creepage distance between the top cover plate 3 and the terminal plate 12 is the shortest distance along the surface of fixed insulating material between the top cover plate 3 and the terminal plate 12, and at least includes: a matching length section between the insulator 4 as well as the seal 2 and the insulating plate 5, or further includes the length section of the side surface, which is most close to the center of the through hole 31 and which is not in contact with the insulating plate 5. When a gap exists between the seal 2 and the insulator 4, the creepage distance can also be constituted by the matching length section between the seal 2 and the insulator 4, the matching length section between the seal 2 and the insulating plate 5, and the side wall section of the seal 2 close to the center of the through hole 31 and uncoated by the insulating plate 5. In the solutions of related technologies, the creepage distance is merely the matching length section between the inner side surface of the sealing ring 2*a* and the insulating plate 4*a*. Therefore, as to the top cover assembly of the present disclosure, regardless of the sealing condition of the seal 2, the creepage distance is extended compared with the solution of the related technology.

Therefore, the top cover assembly of the present disclosure can increase the creepage distance between the top cover plate 3 and the terminal plate 12, correspondingly, the creepage distance between the top cover plate 3 and the connecting piece 6 is also increased, when the electrode assembly is abnormal and high-voltage (a voltage of greater than 500V) discharge occurs, the safety distance inside the secondary battery is equivalent to be increased, thereby lowering the possibility of such risks as outbreak of fire and explosion of a cell, and improving the safety of the secondary battery.

The assembly process of the top cover assembly is as follows: firstly, the insulator 4 is fixed onto the top cover plate 3, then the seal 2 is installed, then the electrode terminal 1 is assembled, and the electrode terminal 1 is welded onto the top cover plate 3, and finally the insulating plate 5 is assembled and fixed onto the top cover plate 3.

Still refer to FIG. 6, the seal 2 is an annular step structure, and includes a first part 21 and a second part 22, and an outline dimension of the second part 22 on a cross section is smaller than that of the first part 21, the outline dimension is the circumferential size. Wherein the first part 21 is arranged between the top cover plate 3 and the terminal plate 12, and the second part 22 is arranged on a side of the insulator 4 close to the center of the through hole 31, and is in contact with the insulator 4. In the actual structure, the parts, in contact with other structures, of the seal 2 all adopt interference fit.

Alternatively, the inner side surface of the second part 22 is flush with the inner side surface of the insulator 4, and such a structure can also increase the creepage distance between the top cover plate 3 and the terminal plate 12.

The top cover assembly shown in FIG. 6 at least has one of the following advantages:

1. the inner side surface of the seal 2 exceeds the inner side surface of the insulator 4, such that the seal 2 and the insulator 4 are staggered with each other, and part of the insulator 4 is enclosed, thereby further increasing the creepage distance, with the increased part being the thickness of the bottom part of the second part 22, and improving the operating safety of the secondary battery.

2. an overlapping part is arranged between the connecting end parts of the seal 2 and the insulator 4, thereby increasing the sealing performance to the electrolyte, reducing the electrolyte on the creepage distance, increasing the resistance in the absence of electrolyte, reducing current at a constant voltage, and weakening the degree of high-voltage discharge.
3. an overlapping part exists between the connecting end parts of the seal 2 and the insulator 4, thereby blocking the electric gap between the top cover plate 3 and the terminal plate 12, and the gap between the top cover plate 3 and the connecting piece 6, reducing the breakdown risk, with the electric gap being the shortest distance between two conducting parts in the air, and increasing insulating reliability. Blocking the electric gap means to isolate originally continuous environmental medium (such as air or electrolyte and other liquid media) between two conductors, such that the environmental medium is no longer continuous, and two conductors can no longer be broken down. When the electric gap is blocked, the electric gap can be deemed as being enlarged to infinity.
4. such a structure can increase the stability of connection between the seal 2 and the insulator 4, and can still play a favorable sealing and insulating role after long-term use.

In some embodiments, the insulator 4 covers an area, close to the through hole 31, of the lower surface of the top cover plate 3, to further increase the creepage distance between the top cover plate 3 and the terminal plate 12.

Still refer to FIG. 6, the insulator 4 is a step annular structure and includes: a third part 41 and a fourth part 42, an outline dimension of the fourth part 42 on a cross section of is smaller than that of the third part 41. Wherein the third part 41 is arranged between the top cover plate 3 and the insulating plate 5, an outer surface of the fourth part 42 is fit with a side wall of the through hole 31, and a top surface of the fourth part 42 is not lower than an upper surface, in contact with the seal 2, of the top cover plate 3. Such a structure can block the direct discharge gap between the top cover plate 3 and the terminal plate 12 or the connecting piece 6, and is further beneficial for locating the seal 2 and the insulator 4, thereby improving reliability and stability of connection between the two, and still playing a favorable sealing and insulating role after long-term use.

Still refer to FIG. 6, the top surface of the fourth part 42 is higher than the bottommost surface of the seal 2, and such a structure can extend the creepage distance, block electric gap, and improve operating reliability and safety of the secondary battery. Specifically, the top surface of the fourth part 42 is higher than the bottom surface of the second part 22 of the seal 2, such that the creepage distance includes the width of the sealing interface in which the second part 22 is in contact with the extending part 52, thereby extending the creepage distance.

On this basis, a concave-convex matching structure is arranged between the seal 2 and the insulator 4, such that the connection between the two parts is firmer, the connecting stability is improved, and in the assembly process, when the seal 2 is squeezed, the seal 2 is not easily misplaced, thereby ensuring the sealing effect.

Specifically, a groove 23 is formed at a bottom surface of the first part 21, and a top end of the fourth part 42 is embedded into the groove 23 to form a concave-convex matching structure. For example, the outer side surface of the second part 22 can be taken as a side wall of the groove 23, and after the top end of the fourth part 42 is embedded into the groove 23, the second part 22 can be tightly fit with the fourth part 42, to improve the sealing effect.

Please refer to FIG. 6, when a gap exists between the seal 2 and the insulator 4, the creepage distance can also be constituted by the matching length section between the seal 2 and the insulator 4, the matching length section between the seal 2 and the insulating plate 5, and the side wall section, close to the center of the through hole 31, of the seal 2.

Figure 7A:
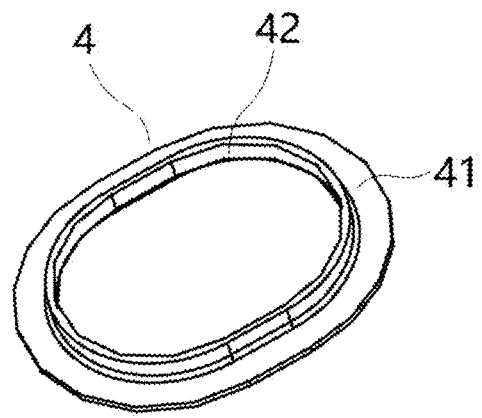
FIG. 7A, FIG. 7B and FIG. 7C are respectively a space diagram, a top view and a B-B sectional view of an insulator in FIG. 6.
Figure 7B:
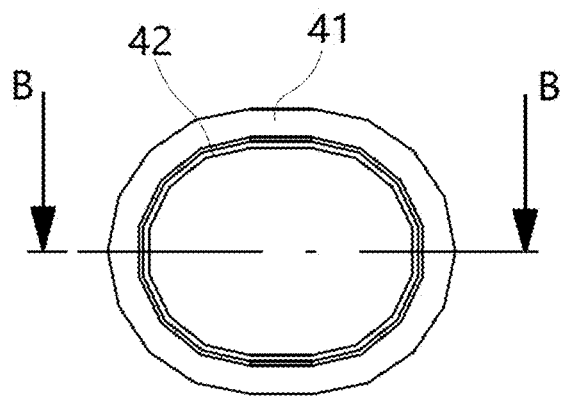
Figure 7C:
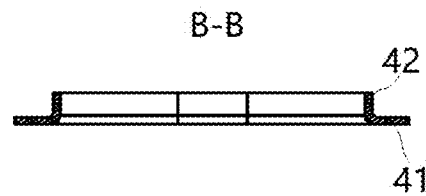

In a structural form, as shown in FIG. 6, the top end of the fourth part 42 is a straight wall section, the width of the groove 23 is adapted to the thickness of the fourth part 42, and the insulator 4 is of an L-shaped structure on the longitudinal section. The structure is easy to assemble. The top end of the fourth part 42 is tightly matched with the groove 23 to form sealed connection, to improve the sealing effect to the electrolyte. The stereogram, top view and B-B sectional view of the seal 2 are respectively shown in FIG. 7A, FIG. 7B and FIG. 7C.

Figure 8:
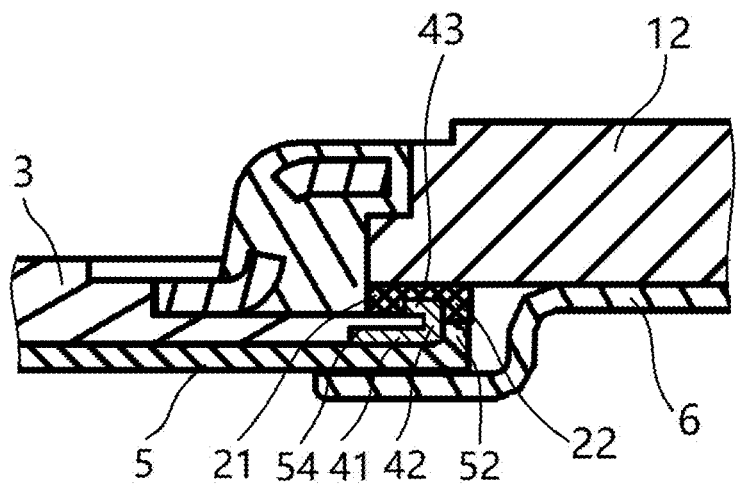
FIG. 8 is a structural schematic diagram of some embodiments in which an extending section is arranged on a top end of an insulator in the top cover assembly of the secondary battery of the present disclosure.
Figure 9A:
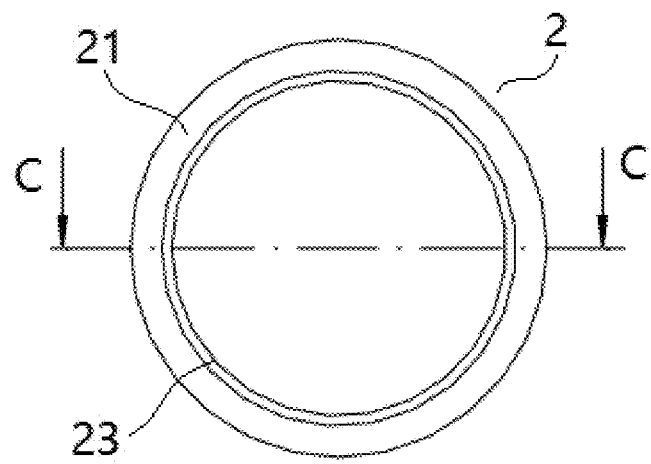
FIG. 9A and FIG. 9B are respectively a top view and a C-C sectional view of an insulator in FIG. 8.
Figure 9B:
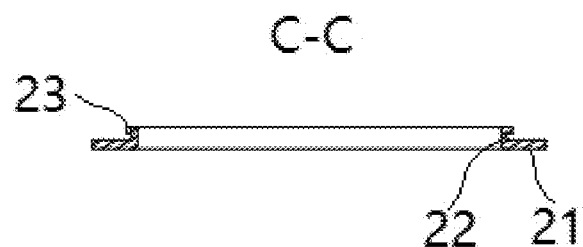

In another structural form, as shown in FIG. 8, the top end of the fourth part 42 is provided with a bending section 43, the bending section 43 extends towards the side away from the second part 22, and is fit to the upper surface, in contact with the seal 2, of the top cover plate 3, and the seal 2 is of a C-shaped structure on the longitudinal section. The bending section 43 and the groove 23 as well as the inner side wall of the fourth part 42 and the outer side wall of the second part 22 are matched tightly to form sealed connection, to improve the sealing effect to the electrolyte. The top view and C-C sectional view of the seal 2 are respectively as shown in FIG. 9A and FIG. 9B.

Such a structure can enlarge the contact area between the insulator 4 and the seal 2 at the connecting point, deformation does not easily occur at the connecting point, and connection firmness and stability are enhanced; moreover, a bending section 43 is added at the top end of the fourth part 42, thereby increasing the strength at the top end of the insulator 4, not easily causing deformation, reducing electrolyte on the creepage distance, reducing current at a constant voltage, and weakening the degree of high-voltage discharge.

As shown in FIG. 6, the insulating plate 5 includes a first main body part 51 and an annular extending part 52 which are connected with each other, the first main body part 51 is of a rectangular plate-shaped structure, and the size is adapted to that of the top cover plate 3. The extending part 52 extends to the through hole 31 and at least part of the extending part 52 is arranged in the through hole 31, and extends towards the electrode terminal 1, and the bottom end of the second part 22 is propped against the top end of the extending part 52. Preferably, the bottom end of the second part 22 is in interference fit with the top end of the extending part 52, to realize sealed connection.

In such a structure, the width of the surface at which the top end of the extending part 52 is propped against the bottom end of the second part 22 also constitutes a part of the creepage distance, thereby further extending the creepage distance, and improving the operating safety of the secondary battery. Moreover, the top end of the extending part 52 can support the seal 2, such that the extending part 52 is in sealed connection with the second part 22, then the seal 2 is simultaneously squeezed by the electrode terminal 1, the top cover plate 3, the insulator 4 and the extending part 52, thereby realizing a favorable sealing performance, even if the extending part 52 falls, the precompression amount of the seal 2 can also offset part of the falling amount of the extending part 52, to maintain the sealing effect between the seal 2 and the extending part 52, reduce the electrolyte on the creepage distance, and block the electric gap between the top cover plate 3 and the connecting piece 6.

Aiming at the structure in which the bottom end of the second part 22 is propped against the top end of the extending part 52, three implementing manners are given below.

In one structural form, as shown in FIG. 6, a contact surface between the extension part 52 and the second part 22 is a horizontal plane. Such a structure is easy to be processed, and the extending part 52 can provide a stable supporting force to the second part 22.

In another structural form, a contact surface between the extension part 52 and the second part 22 is gradually inclined downwards from the inner side to the outer side of the through hole 31, which is not shown in the figure. When the extending part 52 in the structure provides a supporting force to the second part 22, a lateral pressure can be provided to the bottom end of the second part 22, and the sealing effect of the seal 2 is optimized.

In still another structural form, an annular groove is provided on an outer edge of the top end of the extending part 52, and the bottom end of the second part 22 abuts against the annular groove, which is not shown in the figure. In such a structure, a part, outside the annular groove, of the top part of the extending part 52 forms a boss, to further provide a lateral pressure to the bottom end of the second part 22, and optimize the sealing effect of the seal 2.

Figure 10:
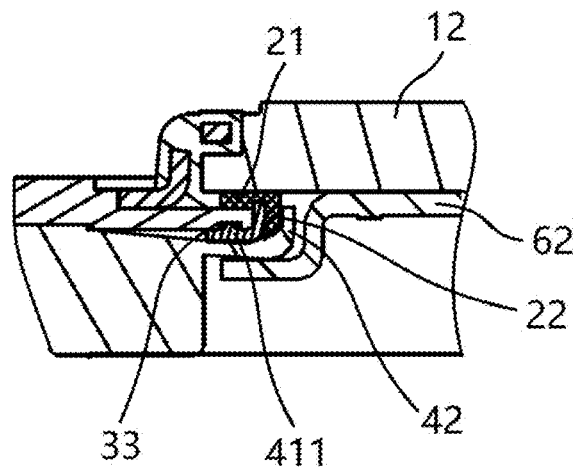
FIG. 10 is a structural schematic diagram of some embodiments in which an extending part of an insulating plate and a second part of a seal are arranged in a staggered manner in a top cover assembly of a secondary battery of the present disclosure.

Still refer to FIG. 6, the third part 41 is arranged between the top cover plate 3 and the insulating plate 5, and a cavity is formed between the third part 41, the top cover plate 3 and the insulating plate 5, for example, a wedge-shaped cavity is formed. For such a structure, the creepage distance between the top cover plate 3 and the terminal plate 12 further includes the height of a side wall, away from one end of the fourth part 42, of the third part 41 of the insulator 4.

Wherein the third part 41 can be fixed with the bottom part of the top cover plate 3 through a manner of bonding, or as shown in FIG. 10, a bulge 411 is arranged on the top surface of the third part 41, the top cover plate 3 is provided with a matching hole 33, the bulge 411 is matched with the matching hole 33 to fix the third part 41 and the top cover plate 3, and a plurality of groups of bulges 411 and matching holes 33 can be arranged along a circumferential direction.

Through such a structure, the structures of the top cover plate 3 and the insulating plate 5 do not need to be changed, only the third part 41 needs to be clamped between the top cover plate 3 and the insulating plate 5 through the deformation of the insulating plate 5, thereby avoiding weakening the strength of the top cover plate 3 and the insulating plate 5, moreover, a resilience force produced when the insulating plate 5 is deformed can enable the extending part 52 to be propped tightly against the second part 22 of the seal 2, thereby improving the sealing effect.

In other structural forms, an accommodating groove 54 is arranged on at least one of the top cover plate 3 and the insulating plate 5, the accommodating groove 54 is an annular groove and is arranged at an area close to the side wall of the through hole 31, the third part 41 is arranged in the accommodating groove 54, and the top cover plate 3 is in contact with the insulating plate 5 in an area outside the accommodating groove 54. Through such a structure, the insulator 4 can be located during assembly, and assembly is facilitated, moreover, when the third part 41 of the insulator 4 is arranged in the accommodating groove 54, the mounting stability can be improved; moreover, the space occupied by the insulator 4 in the housing 8 can be reduced, and the energy density of the battery is improved.

Figure 12:
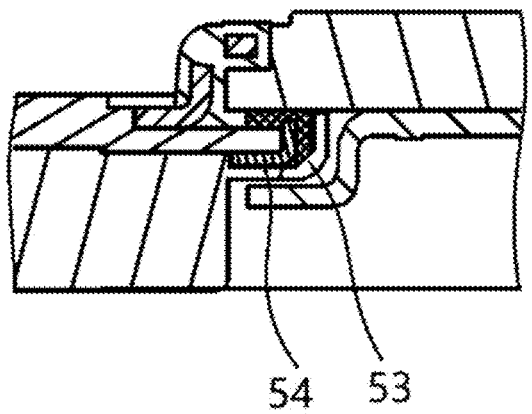
FIG. 12 is a structural schematic diagram of some embodiments in which an accommodating groove is arranged on the insulating plate in a top cover assembly of a secondary battery of the present disclosure.

As shown in FIG. 8, the accommodating groove 54 is arranged at the bottom part of the top cover plate 3. As shown in FIG. 12, the accommodating groove 54 is arranged at the top part of the insulating plate 5, and the creepage distance can be increased compared with the condition in which the accommodating groove 54 is arranged at the bottom part of the top cover plate 3.

Figure 11:
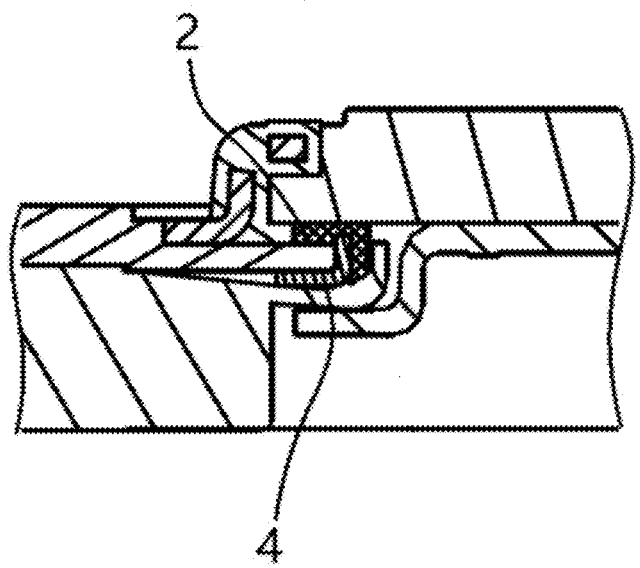
FIG. 11 is a structural schematic diagram of some other embodiments in which an extending part of an insulating plate and a second part of a seal are arranged in a staggered manner in a top cover assembly of a secondary battery of the present disclosure.

In some other embodiments, as shown in FIG. 10 to FIG. 12, the insulating plate 5 includes a first main body part 51 and an annular extending part 52 which are connected with each other, and the extending part 52 extends into the through hole 31 and at least part of the extending part 52 is arranged in the through hole 31, and extends towards the electrode terminal 1. Different from FIG. 6, the second part 22 is arranged between the insulator 4 and the extending part 52, the extending part 52 is in contact with the second part 22, and the bottom end of the second part 22 is in sealed connection with the insulating plate 5. The creepage distance between the top cover plate 3 and the terminal plate 12 at least includes: the length section in which the seal 2 and the insulator 4 are in contact with the insulating plate 5, and the length section, uncoated by the extending part 52, of the inner side surface of the seal 2. Correspondingly, such a structure can also increase the creepage distance between the top cover plate 3 and the connecting piece 6.

In such a structure, the extending part 52 is coated at the side surface of the second part 22, and can provide a pressing force to the side surface of the second part 22, such that different areas of the seal 2 are respectively in close contact with the terminal plate 12, the top cover plate 3, the insulating plate 5 and the insulator 4, such that the seal 2 is suffered from a balanced squeezing force, and the sealing effect is improved. Moreover, when the extending part 52 is coated at the side surface of the second part 22, the contact between the seal 2 and electrolyte can be reduced, thereby preventing swelling of the seal 2, and improving the service life.

Still refer to FIG. 10, a preset distance exists between the top end of the extending part 52 and the bottom part of the electrode terminal 1, such a structure can provide a pressing force to part of the inner side surface of the seal 2, such that the seal 2 is subjected to a balanced squeezing force, and the sealing effect is improved.

As shown in FIG. 12, the top end of the extending part 52 extends to the bottom surface of the electrode terminal 1, and is not in contact with the bottom surface of the electrode terminal 1. The extending part 52 in such a structure can provide a pressing force to the whole inner side surface of the seal 2, such that the seal 2 is subjected to a balanced squeezing force, and the sealing effect is improved; moreover, the extending part 52 can prevent contact between the electrolyte and the seal 2, to prevent swelling of the seal 2. In addition, the top end of the extending part 52 is not in contact with the bottom surface of the electrode terminal 1, to ensure that the bottom part of the electrode terminal 1 can be in close contact with the top part of the seal 2, to improve the sealing performance.

Still refer to FIG. 10, to ensure firm connection between the insulator 4 and the top cover plate 3, a bulge 411 is arranged on the top surface of the third part 41, the top cover plate 3 is provided with a matching hole 33, the bulge 411 is matched with the matching hole 33 to fix the third part 41 and the top cover plate 3, a plurality of groups of bulges 411 and matching holes 33 can be arranged along a circumferential direction, the insulator 4 and the top cover plate 3 are connected firmly and do not easily fall off. The third part 41 is clamped between the top cover plate 3 and the insulating plate 5, encloses a cavity together with the insulator 4, the top cover plate 3 and the insulating plate 5.

FIG. 11 differs from FIG. 10 as follows: to ensure firm connection between the insulator 4 and the top cover plate 3, the third part 41 of the insulating part 4 can be connected to the bottom part of the top cover plate 3 through a manner of bonding, and such a structure can lower the processing difficulty of the top cover plate 3 and the insulator 4, and the assembly is convenient.

FIG. 12 differs from FIG. 10 as follows: an accommodating groove 54 is arranged on the insulating plate 5, the third part 41 is arranged in the accommodating groove 54, and the top cover plate 3 is in contact with the area, outside the accommodating groove 54, of the insulating plate 5.

Still refer to FIG. 12, a protruding part 53 is arranged at the outer side of the connecting portion between the extending part 52 and the first main body part 51, and the second part 22 extends downwards until the second part 22 is in sealed connection with the protruding part 53. The bottom end of the second part 22 is in interference fit with the protruding part 53, to increase the performance of sealed connection between the bottom end of the second part 22 and the insulating plate 5, and reduce the electrolyte on the creepage distance, the resistance can be increased in the absence of electrolyte, so as to reduce current at a constant voltage, and weaken the degree of high-voltage discharge.

For example, in the structure as shown in FIG. 12, the protruding part 53 includes an oblique plane arranged at the connecting portion between the extending part 52 and the first main body part 51. The bottom end of the second part 22 is in interference fit with the oblique plane through compression deformation, and is deformed when the bottom end of the second part 22 is matched with the oblique plane, so as to play a favorable sealing effect. Or, the protruding part 53 includes a step arranged at the connecting part between the extending part 52 and the first main body part 51. The bottom end of the second part 22 is in interference fit with the step to improve the sealing performance.

In the top cover assembly of the present embodiment of the present disclosure, an insulator 4 is added between the top cover plate 3 and the insulating plate 5, to increase the creepage distance between the top cover plate 3 and the electrode terminal 1, when an electrode assembly 7 is abnormal and high-voltage discharge occurs, the safety distance inside the secondary battery is equivalent to be added, thereby lowering the possibility of such risks of outbreak of fire and explosion of a cell, and improving operating safety of the secondary battery.

A brief introduction is given above on the top cover assembly of the secondary battery and the secondary battery provided in the present disclosure. Specific embodiments are used in the text to elaborate the principles and embodiments of the present disclosure, and the description of the above embodiments merely helps to understand the method and its core idea of the present disclosure. It should be pointed out that, for those skilled in the art, under the premise of not departing from the principle of the present disclosure, several improvements and modifications can also be made to the present disclosure, and these improvements and modifications also fall within the protection scope of the claims of the present disclosure.

What is claimed is:

1. A top cover assembly of a secondary battery, comprising:
   a top cover plate, provided with a through hole;
   an electrode terminal, covering the through hole;
   an insulating plate, wherein at least part of the insulating plate is arranged on a side of the top cover plate away from the electrode terminal;
   a seal, wherein at least part of the seal is arranged between the top cover plate and the electrode terminal; and
   an insulator, wherein at least part of the insulator is arranged between the top cover plate and the insulating plate;
   wherein the insulator and the seal at least jointly enclose a side wall of the through hole and an area, close to the through hole, on an upper surface of the top cover plate, the seal and the insulator are staggered with each other, and an overlapping part is formed between connecting end parts of the seal and the insulator,
   wherein the seal is of an annular structure and comprises:
      a first part, arranged between the top cover plate and the electrode terminal; and
      a second part, wherein an outline dimension of the second part relative to a center of the through hole on a cross section is smaller than that of the first part, and
   wherein the insulator is of an annular structure and comprises:
      a third part, arranged between the top cover plate and the insulating plate; and
      a fourth part, wherein an outline dimension of the fourth part relative to a center of the through hole on a cross section is smaller than that of the third part, an outer surface of the fourth part is fit with the side wall of the through hole, and a top surface of the fourth part is not lower than an upper surface, in contact with the seal, of the top cover plate, and the top surface of the fourth part is higher than a bottommost surface of the seal,
   wherein the second part is arranged on a side of the fourth part closest to the center of the through hole and is in contact with the insulator, and
   wherein the insulating plate comprises a first main body part and an annular extending part which are connected with each other, the extending part extends to the through hole and at least part of the extending part is arranged in the through hole, and a bottom end of the second part abuts against a top end of the extending part.

2. The top cover assembly of a secondary battery according to claim 1, wherein the insulator covers an area, close to the through hole, of the lower surface of the top cover plate.

3. The top cover assembly of a secondary battery according to claim 1, wherein a concave-convex matching structure is arranged between the seal and the insulator.

4. The top cover assembly of a secondary battery according to claim 3,
   wherein a groove is formed at a bottom surface of the first part, and a top end of the fourth part is embedded into the groove to form the concave-convex matching structure.

5. The top cover assembly of a secondary battery according to claim 4,
   wherein
      the top end of the fourth part is a straight wall section; or
      the top end of the fourth part is provided with a bending section, and the bending section extends towards a side away from the second part and is fit to the upper surface of the top cover plate in contact with the seal.

6. The top cover assembly of a secondary battery according to claim 1, wherein
- a contact surface between the extending part and the second part is a horizontal plane; or
- a contact surface between the extending part and the second part is gradually inclined downwards from the inner side to the outer side of the through hole; or
- an annular groove is provided on an outer edge of the top end of the extending part, and the bottom end of the second part abuts against the annular groove.

7. The top cover assembly of a secondary battery according to claim 1, wherein a cavity is formed among the third part, the top cover plate and the insulating plate.

8. The top cover assembly of a secondary battery according to claim 1, wherein the third part is provided with a bulge, the top cover plate is provided with a matching hole, and the bulge is matched with the matching hole to fix the third part and the top cover plate.

9. The top cover assembly of a secondary battery according to claim 1, wherein an accommodating groove is arranged on at least one of the top cover plate and the insulating plate, the third part is arranged in the accommodating groove, and the top cover plate is in contact with the area, outside the accommodating groove, of the insulating plate.

10. A secondary battery, comprising:
a housing;
an electrode assembly, arranged in the housing; and
the top cover assembly of the secondary battery according to claim 1, arranged above the electrode assembly to close the housing.

* * * * *